(12) United States Patent
Noda et al.

(10) Patent No.: US 6,350,416 B2
(45) Date of Patent: *Feb. 26, 2002

(54) SYSTEM FOR EXHAUST GAS PURIFICATION

(75) Inventors: Naomi Noda, Ichinomiya; Yukinari Shibagaki, Konan; Akira Takahashi, Nagoya; Hiroshige Mizuno, Tajimi, all of (JP)

(73) Assignee: NSK Insulators, Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/093,789

(22) Filed: Jun. 9, 1998

(30) Foreign Application Priority Data

Jun. 16, 1997 (JP) .............................. 9-158944

(51) Int. Cl.⁷ ......................... B01D 53/34; B01D 53/88; B01D 53/94
(52) U.S. Cl. ........................ 422/171; 422/177; 422/180
(58) Field of Search ................................ 422/171, 174, 422/177, 180; 60/297, 299–300

(56) References Cited

U.S. PATENT DOCUMENTS

| 5,303,547 A | * | 4/1994 | Mieville et al. ............. 422/173 |
| 5,315,824 A | | 5/1994 | Takeshima .................... 60/297 |
| 5,447,694 A | | 9/1995 | Swaroop et al. ............. 422/171 |
| 5,510,086 A | * | 4/1996 | Hemingway et al. ........ 422/180 |
| 5,517,820 A | * | 5/1996 | Kuroda et al. ................. 60/297 |
| 5,538,697 A | * | 7/1996 | Abe et al. .................... 422/180 |

FOREIGN PATENT DOCUMENTS

| EP | 782880 | * 7/1997 |
| JP | 5-59942 | 3/1993 |
| JP | 05057148 | 3/1993 |
| JP | 8-10566 | 1/1996 |
| JP | 8-10613 | 1/1996 |

* cited by examiner

*Primary Examiner*—Hien Tran
(74) *Attorney, Agent, or Firm*—Parkhurst & Wendel, L.L.P.

(57) ABSTRACT

A system for exhaust gas purification disposed in the exhaust pipe of an internal combustion engine, includes an adsorbent formed by loading, on a monolithic carrier, (1) a zeolite containing at least one kind of ion of an element having an electronegativity of 1.40 or more and (2) a catalyst material formed by loading at least one kind of noble metal selected from Pt, Pd and Rh on a heat-resistant inorganic oxide, and at least one loaded carrier formed by loading, on a monolithic carrier, a catalyst component having a purifiability for the harmful substances present in the exhaust gas emitted from the engine and/or an adsorbent component having an adsorptivity for the hydrocarbons also present in the exhaust gas, the loaded carrier being provided upstream of the adsorbent in the flow direction of the exhaust gas and having a total volume of 0.6 l or more. In this system for exhaust gas purification, the thermal deterioration of the adsorbent is reduced because there is used an adsorbent of higher HC desorption start temperature and because the thermal load applied to the adsorbent is decreased by the use of a particular means.

21 Claims, 4 Drawing Sheets

SYSTEM FOR EXHAUST GAS PURIFICATION

BACKGROUND OF THE INVENTION (1) Field of the Invention

The present invention relates to a system for exhaust gas purification, capable of effectively purifying the harmful substances present in the exhaust gas emitted from an internal combustion engine, particularly the hydrocarbons discharged from the engine in a large amount during the cold start.

(2) Description of Related Art

Active researches and developments have heretofore been made on systems for exhaust gas purification, used for purifying the harmful substances present in exhaust gas from automobile engine, such as nitrogen oxides ($NO_x$), carbon monoxide (CO), hydrocarbons (HC) and the like. In recent years, as the regulation on exhaust gas has become stricter, the purification of HC during engine start (cold start) has become an important technical task.

The reason is as follows. During the cold start of engine when the temperature of exhaust gas from engine is low, the catalyst disposed in exhaust pipe of engine does not reach its light-off temperature and has a low purification ability. Moreover, during this period, as compared with the period of continuous operation of engine, a large amount of HC is discharged from the engine. As a result, the HC discharged during the cold start occupies a large proportion of the total harmful substances discharged from the engine and needs to be removed.

As one means for achieving the above-mentioned technical task (the purification of HC during engine start), there was proposed a system for exhaust gas purification disposed in the exhaust pipe of an internal combustion engine, comprising (1) an absorbent containing a component (e.g. zeolite) having an adsorptivity for HC and (2) a catalyst provided downstream of the adsorbent (1). This adsorbent is intended to adsorb the unburnt HC discharged from the engine in a large amount during the cold start, temporarily from the start of catalyst heating to the start of catalyst light-off.

The HC adsorbed on an adsorbent begins to be desorbed from the adsorbent as the temperature of the adsorbent is elevated owing to the heat of exhaust gas, etc. The temperature at which the HC begins to be desorbed from the adsorbent, is lower than the light-off start temperature of catalyst; therefore, the desorption of HC begins before the light-off start of catalyst. Consequently, the most part of the HC desorbed from the adsorbent during the period from the HC desorption start of adsorbent to the light-off start of catalyst is discharged into the air without being purified. Hence, in the exhaust gas purification system comprising an adsorbent, it is necessary that the time span from the timing at which the adsorbent reaches the HC desorption start temperature, to the timing at which the catalyst reaches the light-off start temperature, is minimized in order to minimize the amount of the HC discharged without being purified.

As one means for minimizing the above-mentioned time span, there can be mentioned a technique of increasing the HC desorption start temperature of adsorbent. As one such technique, there is disclosed, in Japanese Patent Application Kokai (Laid-Open) No. 10613/1996, an adsorbent of higher HC desorption start temperature, obtained by allowing a zeolite to contain at least one kind of ion of an element having an electronegativity of 1.40 or more. Also in Japanese Patent Application Kokai (Laid-Open) No. 10566/1996, it is disclosed that a catalyst-adsorbent containing at least one noble metal selected from Pt, Pd and Rh and a zeolite can give a higher HC desorption start temperature by allowing the zeolite to contain at least one kind of ion of an element having an electronegativity of 1.40 or more.

As other means for minimizing the time span, there can be mentioned a technique of slowing the temperature elevation of adsorbent. For example, Japanese Patent Application Kokai (Laid-Open) No. 5-59942 discloses a cold HC remover comprising an HC adsorbent and a three-way catalyst provided upstream of the adsorbent. In this apparatus, the temperature elevation of the HC adsorbent is slowed because the three-way catalyst provided upstream of the HC adsorbent absorbs the heat of exhaust gas and thereby the gas temperature at the adsorbent inlet is kept low for a relatively long time.

The adsorbent disclosed in Japanese Patent Application Kokai (Laid-Open) No. 8-10613 and the catalyst-adsorbent disclosed in Japanese Patent Application Kokai (Laid-Open) No.8-10566, certainly have a higher HC desorption start temperature as compared with ordinary adsorbents using a zeolite. However, they have had a problem in that they have insufficient heat resistance and easily undergo thermal deterioration. Further, the technique disclosed in Japanese Patent Application Kokai (Laid-Open) No. 5-59942 are unable, at times, to sufficiently exhibit the intended effect of slowing the temperature elevation of HC adsorbent, because no consideration is made to the volume or heat capacity of the three-way catalyst provided upstream of the HC adsorbent.

SUMMARY OF THE INVENTION

The present invention has been completed in view of the above situation and is intended to provide a system for exhaust gas purification where the thermal deterioration of the adsorbent is reduced because there is used an adsorbent of higher HC desorption start temperature and because the thermal load applied to the adsorbent is decreased by the use of a particular means.

According to the present invention, there is provided a system for exhaust gas purification (the first system for exhaust gas purification) disposed in the exhaust pipe of an internal combustion engine, which comprises:

an adsorbent formed by loading, on a monolithic carrier, (1) a zeolite containing at least one kind of ion of an element having an electronegativity of 1.40 or more and (2) a catalyst material formed by loading at least one kind of noble metal selected from Pt, Pd and Rh on a heat-resistant inorganic oxide, and at least one loaded carrier formed by loading, on a monolithic carrier, a catalyst component having a purifiability for the harmful substances present in the exhaust gas emitted from the engine and/or an adsorbent component having an adsorptivity for the hydrocarbons also present in the exhaust gas, the loaded carrier being provided upstream of the adsorbent in the flow direction of the exhaust gas and having a total volume of 0.6 l or more.

According to the present invention, there is further provided a system for exhaust gas purification (the second system for exhaust gas purification) disposed in the exhaust pipe of an internal combustion engine, which comprises:

an adsorbent formed by loading, on a monolithic carrier, a zeolite containing (1) at least one kind of ion of an element having an electronegativity of 1.40 or more and (2) at least one kind of noble metal selected from Pt, Pd and Rh, and at least one loaded carrier formed by loading, on a monolithic carrier, a catalyst component having a purifiability for the harmful substances present in the exhaust gas emitted from the engine and/or an adsorbent component having an adsorptivity for the hydrocarbons also present in the exhaust gas, the loaded carrier being provided upstream of the adsorbent in the flow direction of the exhaust gas and having a total volume of 0.6 l or more.

According to the present invention, there is furthermore provided a system for exhaust gas purification (the third system for exhaust gas purification) disposed in the exhaust pipe of an internal combustion engine, which comprises:

an adsorbent formed by loading, on a monolithic carrier, a zeolite containing at least one kind of ion of an element having an electronegativity of 1.40 or more, a catalyst formed by loading, on a monolithic carrier, a catalyst material formed by loading at least one kind of noble metal selected from Pt, Pd and Rh on a heat-resistant inorganic oxide, the catalyst being provided downstream of the adsorbent in the flow direction of the exhaust gas emitted from the engine, and at least one loaded carrier formed by loading, on a monolithic carrier, a catalyst component having a purifiability for the harmful substances present in the exhaust gas emitted from the engine and/or an adsorbent component having an adsorptivity for the hydrocarbons also present in the exhaust gas, the loaded carrier being provided upstream of the adsorbent in the flow direction of the exhaust gas and having a total volume of 0.6 l or more.

DETAILED DESCRIPTION OF THE PREFERRED EMBODIMENT

Figure 1:
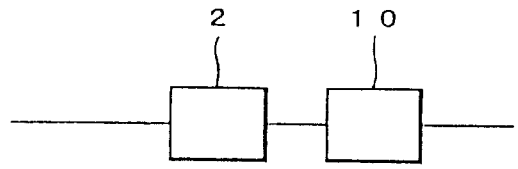
FIG. 1 is a schematic drawing showing the system for exhaust gas purification used in Example 1 or 14.

Description is made first on the first system for exhaust gas purification. The first system for exhaust gas purification is disposed in the exhaust pipe of an internal combustion engine and comprises:

an adsorbent for adsorbing thereon the HC present in the exhaust gas emitted from the engine, and a loaded carrier having a given volume, provided upstream of the adsorbent in the flow direction of the exhaust gas.

In this system, the loaded carrier has a primary purpose of reducing the thermal load applied to the adsorbent provided downstream thereof. That is, the heat of the exhaust gas is absorbed by the loaded carrier, whereby the excessive temperature increase of the downstream adsorbent is prevented and the thermal deterioration of the adsorbent is suppressed.

The adsorbent used in the first system for exhaust gas purification is formed by loading, on a monolithic carrier, (1) a zeolite containing at least one kind of ion of an element having an electronegativity of 1.40 or more (the zeolite is hereinafter referred to as "ion-containing zeolite") and (2) a catalyst material formed by loading at least one kind of noble metal selected from Pt, Pd and Rh on a heat-resistant inorganic oxide.

An ion of an element having a large electro-negativity attracts an electron(s) easily; therefore, presence of the ion in zeolite allows the zeolite to have a high interaction with HC molecules; consequently, the zeolite has higher adsorptivity for HC, adsorbs a larger amount of HC, and shows a higher temperature of HC desorption start.

The ion of an element having an electronegativity of 1.40 or more includes ions of Al, Ti, V, Mn, Fe, Co, Ni, Cu, Zn, Pd, Ag, Pt, Au, etc. When the above ion is at least one kind of ion of an element selected from 1B group elements (Cu, Ag and Au) of periodic table and is allowed to be present in zeolite, the ion can show high adsorptivity for HC even in the presence of moisture and, moreover, the ion exhibits even a catalytic activity at temperatures of 150° C. or higher. Of these 1B element ions, Cu and Ag ions are preferred and Ag ion is particularly preferred because it can adsorb a larger amount of HC up to higher temperatures. Further, Ag ion can show, even when $O_2$ is absent, the same adsorptivity as when $O_2$ is present; therefore, Ag ion shows excellent adsorptivity even when subjected to, for example, a fuel-rich atmosphere in automobile exhaust gas system.

When Ag ion and Cu ion are allowed to be present together in zeolite, there can be obtained both the effect of higher adsorptivity by Ag ion and the effect of higher adsorptivity and catalytic activity by Cu ion; thus, an excellent purification ability in a wide temperature range from low temperatures to high temperatures can be obtained. Further, the presence of these two kinds of ions can prevent agglomeration of respective ions, leading to improved heat resistance.

When the content of ion in zeolite is small, its effect on increase in HC desorption start temperature is low. Hence, the content of ion in zeolite is preferably 20% or more, more preferably 40% or more based on the Al atoms in zeolite.

As the zeolite in which the above-mentioned ion is allowed to be present, there can be suitably used a high-silica zeolite having a $SiO_2/Al_2O_3$ molar ratio of 40 or more, preferably 70 or more, more preferably 100 or more, in view of the heat resistance. When the ion is allowed to be loaded on a zeolite by an ion exchange method, the zeolite had better have a smaller $SiO_2/Al_2O_3$ molar ratio; however, use of a high-silica zeolite is preferred for the prevention of the thermal deterioration of zeolite.

Specific examples of the zeolite usable are ZSM-5, USY, β-zeolite, a metallosilicate, ferrierite, mordenite and erionite. These zeolites can be used singly or in combination of two or more kinds.

For example, ZSM-5 having relatively small pores of about 0.55 nm in diameter is advantageous for adsorption of HC of small molecule having an effective toluene molecular diameter or smaller; USY having relatively large pores of about 0.74 nm in diameter is advantageous for adsorption of HC of large molecule having an effective m-xylene molecular diameter or larger; and β-zeolite having bimodal pores of about 0.55 nm and about 0.70 nm in diameter is advantageous in that it can relatively well adsorb both small molecule HC and large molecule HC.

Thus, use of a plurality of zeolites having different pore diameters, in any combination allows for efficient adsorption of various hydrocarbons of different effective molecular diameters. When a plurality of different zeolites are used in combination, they can be loaded on a monolithic carrier in a mixed state or in a state of laminated layers, or can be loaded apart on the different parts (i.e. the upstream and downstream parts) of a monolithic carrier; or, they can be loaded on respective monolithic carriers and the loaded carriers can be used in combination.

The catalyst material to be loaded on a monolithic carrier together with the ion-containing zeolite, is formed by loading at least one noble metal selected from Pt, Pd and Rh, on a heat-resistant inorganic oxide. Of these noble metals, Pd is preferred for its excellent low-temperature light-off property. Desirably, at least part of the catalyst material is a material formed by loading Pd on a heat-resistant inorganic oxide in an amount of 1–30% by weight, preferably 2–10% by weight based on the inorganic oxide.

As the heat-resistant inorganic oxide on which a noble metal(s) is (are) loaded, there can be suitably used active alumina, zirconia, silica, titania, etc. Of these, active alumina and/or zirconia is preferred in view of the interaction with the noble metal(s). When an active alumina having a specific surface area of 100 $m^2/g$ or more is used, a noble metal(s) is (are) loaded thereon in a highly dispersed state, whereby preferable catalytic activity is expressed. Zirconia, when used in combination with Rh, provides improved heat resistance particularly in an oxidizing atmosphere.

To the heat-resistant inorganic oxide is ordinarily added a rare earth element oxide, a compound oxide of rare earth element oxides or a compound oxide of a rare earth element oxide and zirconia. As the rare earth element oxide to be added to the heat-resistant inorganic oxide, there can be suitably used $CeO_2$, $La_2O_3$, a compound oxide thereof, etc. The addition of such a rare earth element oxide provides a catalyst of higher oxygen storage capacity (OSC) and wider three-way catalytic performance.

The addition of a rare earth element oxide to a heat-resistant inorganic oxide, for example, the addition of $CeO_2$ to active alumina may be conducted by adding a $CeO_2$ powder to active alumina. However, it can be conducted particularly preferably by impregnating active alumina with a cerium compound, calcinating the impregnated alumina to form an active alumina-ceria compound oxide, and adding thereto a $CeO_2$ powder as necessary, because this practice can improve the heat resistance of active alumina and the OSC of ceria. Incidentally, addition of $CeO_2$ to a heat-resistant inorganic oxide had better be avoided when Rh is loaded on the inorganic oxide, because the properties of Rh are impaired by the coexistence of $CeO_2$.

The monolithic carrier on which the ion-containing zeolite and the catalyst material are to be loaded, is a structure having passages (cells) surrounded by substantially uniform partition walls, which is generally called a honeycomb structure. As the material for the monolithic carrier, there are suitably used ceramic materials made of cordierite, mullite or the like; foil-shaped metallic materials made of heat-resistant stainless steel (e.g. Fe—Cr—Al alloy); and metallic materials molded into a honeycomb structure by powder metallurgy.

The ion-containing zeolite and the catalyst material are loaded on the monolithic carrier preferably in a mixed state in view of their mutual contact in the resulting adsorbent; however, they are loaded preferably in a state of laminated layers in view of the durability of the adsorbent. When they are loaded in laminated layers, it is preferred that the surface layer is a layer of the catalyst material because the HC desorbed from the ion-containing zeolite can be effectively purified by the surface layer which is a layer of the catalyst material. In the first system for exhaust gas purification, when the adsorbent is formed by loading the ion-containing zeolite and the catalyst material in laminated layers and no catalyst is provided downstream of the adsorbent, the HC desorbed form the ion-containing zeolite of the adsorbent is purified only by the catalyst material of the adsorbent; in this case, therefore, it is essential that the catalyst material layer is formed as the surface layer of the adsorbent.

The loaded carrier provided upstream of the adsorbent is formed by loading, on a monolithic carrier, a catalyst component having a purifiability for the harmful substances present in the exhaust gas emitted from an internal combustion engine and/or an adsorbent component having an adsorptivity for the hydrocarbons also present in the exhaust gas. The loaded carrier has no restriction as to its number but must have a total volume of 0.6 l or more, preferably 1.0 l or more. Incidentally, in the present invention, the volume of the loaded carrier refers to a volume of the monolithic carrier used in the loaded carrier, as defined by its contour, including the passages (cells) formed in the carrier. Since the ion-containing zeolite used in the adsorbent has a high HC desorption start temperature but no sufficient heat resistance, the loaded carrier having a total volume such as mentioned above is provided upstream of the adsorbent to reduce the thermal load applied to the adsorbent. When the loaded carrier has a total volume of smaller than 0.6 l, the thermal load of the adsorbent is not sufficiently reduced and the thermal deterioration of the adsorbent cannot be suppressed effectively.

The loaded carrier may be a catalyst obtained by loading a catalyst component alone on a monolithic carrier, or an adsorbent formed by loading an adsorbent component alone on a monolithic carrier, or a catalyst-adsorbent formed by loading a catalyst component and an adsorbent component on a monolithic carrier, or any combination thereof having a total volume of 0.6 l or more. The loaded carrier not only reduces the thermal load applied to the adsorbent but also exhibits a catalytic activity and/or an adsorptivity by itself.

When the loaded carrier is a catalyst or a catalyst-adsorbent, it can exhibit a light-off property at an early timing because it is provided at the most upstream position of the first system where the exhaust gas temperature is high, whereby the harmful substances present in the exhaust gas can be purified effectively. When the loaded carrier is an adsorbent or a catalyst-adsorbent, this loaded carrier and the adsorbent provided downstream thereof can totally have a large capacity for HC adsorption. In order to allow the loaded carrier per se to show a sufficient action, the loaded carrier preferably has a total volume of 1.5 l or more. In order for the loaded carrier to be able to show the effect over a long period of time, the loaded carrier preferably has a total volume of 2.0 l or more.

Owing to the catalytic activity and/or adsorptivity of the loaded carrier and the action of the adsorbent whose thermal load is reduced by the loaded carrier, the first system for exhaust gas purification according to the present invention can exhibit an excellent purifiability to the harmful substances present in the exhaust gas emitted from an internal combustion engine, particularly the HC discharged in a large amount during the cold start of the engine, over a long period of time.

When the loaded carrier is an adsorbent or a catalyst-adsorbent, the adsorbent component loaded on the monolithic carrier can be a zeolite or a combination of a plurality of zeolites as in the above-mentioned adsorbent provided downstream of a loaded carrier. The zeolite(s) can be the same or different from the zeolite(s) used in the adsorbent provided downstream of the loaded carrier. Further, the zeolite(s) may be present together with a catalyst material formed by loading a noble metal on a heat-resistant inorganic oxide, or may contain such a noble metal therein. The adsorbent or the catalyst-adsorbent used as the loaded carrier provided at the upstream position of the first system for exhaust gas purification must have heat resistance; therefore, the adsorbent or the catalyst-adsorbent should not contain, as the adsorbent component, an ion-containing zeolite of low heat resistance such as used in the adsorbent provided downstream of the loaded carrier. For securing heat resistance, the zeolite(s) contained in the adsorbent or the catalyst-adsorbent, preferably has (have) a high $SiO_2/Al_2O_3$ molar ratio.

Meanwhile, when the loaded carrier is a catalyst or a catalyst-adsorbent, the catalyst component loaded on the monolithic carrier can be at least one noble metal selected from Pt, Pd, Rh, etc. with Pd being particularly preferred. Preferably, at least one of a plurality of the catalysts or catalyst-adsorbents contain Rh as the catalyst component in order to reduce not only the HC emitted during cold start but also $NO_x$. The noble metal(s) may be used by being loaded on a heat-resistant inorganic oxide, as in the catalyst material used in the adsorbent provided downstream of the loaded carrier. In this case, to the heat-resistant inorganic oxide may be added a rare earth element oxide, a compound oxide of rare earth element oxides, or a compound oxide of a rare earth element oxide and zirconia, in order to allow the loaded carrier to have an increased oxygen storage capacity (OSC). The catalyst or catalyst-adsorbent as loaded carrier provided at the upstream position of the first system is disposed preferably in the vicinity of engine wherein the exhaust gas temperature is high, for example, within 1,000 mm from the exhaust port of engine, in order to obtain a high purification efficiency.

When the loaded carrier is a catalyst-adsorbent, it can be formed by loading, on a monolithic carrier, a catalyst component and an adsorbent component in a mixed state or in a state of laminated layers, as in the case of forming the adsorbent provided downstream of the loaded carrier, by loading an ion-containing zeolite and a catalyst material on a monolithic carrier.

Next, description is made on the second system for exhaust gas purification according to the present invention. Similarly to the first system for exhaust gas purification, the second system for exhaust gas purification is disposed in the exhaust pipe of an internal combustion engine and comprises:

an adsorbent using an ion-containing zeolite, and a loaded carrier having a given volume, provided upstream of the adsorbent in the flow direction of the exhaust gas emitted from the engine.

The second system, however, differs slightly from the first system in the constitution of the adsorbent.

That is, in the adsorbent of the second system, at least one kind of noble metal is not loaded on a heat-resistant inorganic oxide unlike in the adsorbent of the first system and is contained in a zeolite together with at least one kind of ion of an element having an electronegativity of 1.40 or more. The at least one kind of noble metal is selected from Pt, Pd and Rh with Pd being particularly preferred for the excellency in low-temperature light-off property.

The kind of the zeolite used in the adsorbent of the second system is the same as in the adsorbent of the first system. In the second system as well, the loaded carrier has a primary purpose of reducing the thermal load applied to the adsorbent provided downstream thereof, and it has the same constitution as the loaded carrier of the first system.

Then, description is made on the third system for exhaust gas purification according to the present invention. Similarly to the first system for exhaust gas purification, the third system for exhaust gas purification is disposed in the exhaust pipe of an internal combustion engine and comprises:

an adsorbent using an ion-containing zeolite, and a loaded carrier having a given volume, provided upstream of the adsorbent in the flow direction of the exhaust gas emitted from the engine.

The adsorbent of the third system, however, need not contain any noble metal required in the adsorbents of the first and second systems. In the third system, the adsorbent using an ion-containing zeolite has a basic function of HC adsorption alone and the HC desorbed from the adsorbent is purified by a catalyst provided downstream of the adsorbent.

The catalyst provided downstream of the adsorbent using an ion-containing zeolite is formed by loading, on a monolithic carrier, a catalyst material formed by loading at least one noble metal selected from Pt, Pd and Rh on a heat-resistant inorganic oxide. The details of the catalyst material used in the catalyst are the same as those of the catalyst material used in the adsorbent of the first system. The adsorbent and the catalyst provided downstream thereof are produced ordinarily using separate monolithic carriers; however, the adsorbent and the catalyst may be formed in one piece by loading an ion-containing zeolite and a catalyst material apart on one monolithic carrier, i.e. on the upstream and downstream positions of the monolithic carrier.

The kind of the zeolite used in the adsorbent of the third system is the same as in the adsorbent of the first system. In the third system as well, the loaded carrier has a primary purpose of reducing the thermal load applied to the adsorbent provided downstream thereof, and it has the same constitution as the loaded carrier of the first system.

In producing the adsorbents, loaded carriers, etc. constituting the first to third systems for exhaust gas purification, when at least one kind of noble metal is allowed to be present in a heat-resistant inorganic oxide or a zeolite, it is preferred to allow a heat-resistant inorganic oxide or a zeolite to contain at least one kind of noble metal and then load the resulting material on a monolithic carrier, because this practice can produce an adsorbent, a loaded carrier or the like each of higher heat resistance. In producing the adsorbent, etc. not requiring high heat resistance, provided at the downstream position of each system, there can be employed a simple practice of first loading a heat-resistant inorganic oxide or a zeolite on a monolithic carrier and then immersing the resulting material in a noble metal solution to impregnate the material with a noble metal.

When two or more kinds of noble metals or two or more kinds of ions of elements having an electronegativity of 1.40 or more are allowed to be present in zeolite, the noble metals or ions may be allowed to be present each in a different zeolite (these zeolites may be the same kind or different kinds) and the resulting materials may be loaded on one monolithic carrier; alternatively, the noble metals or ions may be allowed to be present in one zeolite simultaneously or in order and the resulting material may be loaded on a monolithic carrier.

The at least one kind of ion can be allowed to be present in zeolite by ion exchange, impregnation or other method. Of them, ion exchange is preferred in view of the thermal stability of the resulting adsorbent. When a plurality of ions of elements having an electronegativity of 1.40 or more are allowed to be present in zeolite, all the ions may be allowed to be present by one method or by two or more different methods.

When the ion is allowed to be present in zeolite by ion exchange, the ion exchange rate can be increased by increasing the concentration of the metal salt solution used in ion exchange, or by taking a longer time for ion exchange. When ion exchange is conducted for a given length of time with a metal salt solution of a given concentration and, after filtration, ion exchange is again conducted similarly using a new metal salt solution, the ion exchange rate can be increased by increasing the times of ion exchange with new solution.

In the first to third systems for exhaust gas purification according to the present invention, even when the adsorbent using an ion-containing zeolite contains a noble metal(s) or even when a catalyst is provided downstream of the adsorbent, these systems may be insufficient in total catalyst amount. Hence, at least one of a plurality of the loaded carriers provided at the upstream position of each system is preferably a catalyst or a catalyst-adsorbent, particularly preferably a catalyst. In a preferred embodiment, all the loaded carriers are catalysts.

In order for the present system for exhaust gas purification to be able to show a higher purifiability during the steady state operation of engine after engine warm-up, a catalyst may be provided downstream of the adsorbent (using an ion-containing zeolite) in the first or second system, or downstream of the catalyst provided downstream of the adsorbent (using an ion-containing zeolite) in the third system.

In the first to third systems for exhaust gas purification according to the present invention, when a catalyst is provided downstream of the adsorbent using an ion-containing zeolite or downstream of the loaded carrier used as an adsorbent or catalyst-adsorbent, it is preferred to (1) allow the adsorbent or the loaded carrier to have a portion of low pressure loss by changing the length or porosity of part of the adsorbent or the loaded carrier or (2) form, in the adsorbent or the loaded carrier, a blowing-through hole having a diameter larger than the diameter of the passages (cells) of the monolithic carrier, to allow part of the exhaust gas to blow through the hole, because (1) or (2) accelerates the warm-up of the catalyst provided downstream of the adsorbent or the loaded carrier and enhances the efficiency of purification of desorbed HC.

The diameter of the blowing-through hole is preferably 50 mm or less in view of the strength of carrier; the diameter is more preferably 40 mm or less in order to prevent the reduction in amount of HC adsorption, caused by blowing-through of excessive amount of exhaust gas. Conversely, when the diameter of the blowing-through hole is too small, the warm-up of the catalyst provided downstream of the adsorbent or the loaded carrier is insufficient. Therefore, the diameter is preferably 10 mm or more.

In the first to third systems for exhaust gas purification according to the present invention, it is also preferred that at least one electrical heater (hereinafter referred to as "EH") is disposed in the same exhaust line in order to achieve the early activation of the catalyst. The EH is preferably constituted by a honeycomb structure made of a heat-resistant metal (e.g. ferrite) and electrodes attached to the honeycomb structure for electrification thereof, in view of the pressure loss and heat resistance. This EH is preferably used in the form of an electrically-heated catalyst (hereinafter referred to as "EHC") which comprises the EH and a catalyst layer formed thereon, made of a noble metal-containing heat-resistant inorganic oxide, because, with the EHC, the electricity required for heating of EH can be reduced owing to the reaction heat of catalyst.

In one preferred embodiment of the present system for exhaust gas purification, the EHC may be provided upstream of the system to accelerate the warm-up of the system, or downstream of the adsorbent using an ion-containing zeolite, to ensure the purification of the HC desorbed from the adsorbent.

In conducting exhaust gas purification during the cold start of engine by using the present system for exhaust gas purification, when, for a certain period during the cold start, an oxidizing gas (e.g. secondary air) is introduced into the exhaust gas or the ratio of the amount of air for combustion and the amount of fuel is changed so as to increase the oxygen amount in exhaust gas, the combustion reaction on catalyst is promoted and the early light-off of catalyst is achieved. The above introduction of oxidizing gas or the above change of the ratio of the amount of air for combustion and the amount of fuel for increased oxygen supply is preferred because as the HC adsorbed on the adsorbent begins to be desorbed with the temperature rise of the adsorbent caused by the heat of exhaust gas, the HC concentration in exhaust gas increases and the oxygen required for purification (combustion) of HC becomes short.

The present system for exhaust gas purification functions satisfactorily by applying one system to one internal combustion engine. In a two-bank type engine, each one system (total two systems) may be applied to each bank.

In the present system for exhaust gas purification, at least one loaded carrier having a given total volume is provided upstream of an adsorbent using an ion-containing zeolite, in order to reduce the thermal load applied to the adsorbent. This reduction in the thermal load is also possible by other methods, for example, by (1) providing the adsorbent at a position as far as possible from the internal combustion engine or (2) providing a cooling (water cooling or air cooling) means between the internal combustion engine and the adsorbent. However, the way of the present invention, i.e. the provision of a loaded carrier containing a catalyst component and/or an adsorbent component, upstream of an adsorbent using an ion-containing zeolite is most preferred because it can not only reduce the thermal load applied to the adsorbent but also utilize the effect of the loaded carrier per se, i.e. the purification and/or adsorption effect. In the present invention, the method (1) and/or the method (2) may be employed in combination with the present system to obtain a higher reduction in the thermal load applied to the adsorbent.

The present invention is described below in more detail by way of Examples. However, the present invention is not restricted to these Examples.

[Production of catalysts]

A commercial $\gamma$-$Al_2O_3$ having a specific surface area of 200 $m^2$/g was impregnated with a noble metal (Pd or Rh) by the use of an aqueous $Pd(NO_3)_2$ solution or an aqueous $Rh(NO_3)_3$ solution. The resulting material was dried and then fired at 500° C. to obtain a Pd-loaded $Al_2O_3$ powder and a Rh-loaded $Al_2O_3$ powder. To each of these noble metal-loaded $Al_2O_3$ powders were added appropriate amounts of water and acetic acid. To the Pd-loaded $Al_2O_3$ powder was further added 30% by weight of a $CeO_2$ powder. Each mixture was subjected to wet pulverization to produce two kinds of slurries to be coated, i.e. a Pd-loaded $Al_2O_3.CeO_2$ slurry and a Rh-loaded $Al_2O_3$ slurry.

Of these slurries to be coated, the Pd-loaded $Al_2O_3.CeO_2$ slurry was coated on a cordierite monolithic carrier manufactured by NGK Insulators, Ltd. (diameter: 3.66 in., volume: 0.5 l, partition wall thickness: 6 mil, cell density: 400 $cpi^2$) in a Pd amount of 100 g/$ft^3$. The coated carrier was fired at 500° C. to obtain catalyst A1.

The Pd-loaded $Al_2O_3.CeO_2$ slurry was also coated on a cordierite monolithic carrier manufactured by NGK Insulators, ltd. (diameter: 4.66 in., volume: 1.0 l, partition wall thickness: 6 mil, cell density: 400 $cpi^2$) in a Pd amount of 100 g/$ft^3$. The coated carrier was fired at 500° C. Thereon was coated the Rh-loaded $Al_2O_3$ slurry in a Rh amount of 10 g/$ft^3$, and the resulting material was fired at 500° C. to obtain catalyst A2.

[Production of adsorbent]

Appropriate amounts of water and acetic acid were added to a commercial zeolite powder (H type ZSM-5, $SiO_2$/$Al_2O_3$=120). Thereto was added 5% by weight (as oxide) of an $Al_2O_3$ sol. The resulting mixture was subjected to wet pulverization to prepare a slurry to be coated. The slurry was coated on a cordierite monolithic carrier manufactured by NGK Insulators, Ltd. (diameter: 4.66 in., volume: 1.0 l, partition wall thickness: 6 mil, cell density: 400 $cpi^2$). The coated carrier was fired at 500° C. to obtain adsorbent B1.

[Production of catalyst-adsorbents]

Appropriate amounts of water and acetic acid were added to a commercial zeolite powder (H type ZSM-5, $SiO_2$/$Al_2O_3$=120). Thereto was added 5% by weight (as oxide) of an $Al_2O_3$ sol. The resulting mixture was subjected to wet pulverization to prepare a slurry to be coated. The slurry was coated on a cordierite monolithic carrier manufactured by NGK Insulators, Ltd. (diameter: 4.66 in., volume: 1.0 l, partition wall thickness: 6 mil, cell density: 400 $cpi^2$). The coated carrier was fired at 500° C. Thereon was coated the same Pd-loaded $Al_2O_3.CeO_2$ slurry as used in the above [Production of catalysts], followed by firing at 500° C., to obtain catalyst-adsorbent C1.

Catalyst-adsorbent C2 was obtained in the same manner as in the catalyst-adsorbent C1 except that, in the uncoated monolithic carrier, a blowing-through hole was made (the monolithic carrier after hole making had a volume of 0.95 l) by gouging a cylindrical portion of the carrier, having a diameter of 25 mm, whose central axis was identical with that of the carrier and which extended in the axial direction of the passages (cells) of the carrier.

[Production of adsorbents each containing an ion-containing zeolite]

Three kinds of ion-containing zeolite powders shown in Table 1 were obtained by ion exchange, as follows.

Desired amounts of a zeolite powder, a metal salt and deionized water were each weighed, and they were mixed so as to give a metal salt concentration in solution, of 0.05–0.2 mole/l. The resulting solution was kept at 80–90° C. and subjected to ion exchange for 2 hours (per each ion exchange) with stirring. After filtration, ion exchange was conducted again with a new solution, and this filtration and subsequent ion exchange with new solution was repeated 3–5 times. Then, washing was conducted with deionized water at 50° C. for 15 minutes (per each washing), followed by filtration. This washing and filtration was repeated 5–10 times. The resulting material was dried in air at 100° C. for 10 hours and then calcinated in air at 550° C. for 1 hour to obtain three kinds of zeolite powders each subjected to ion exchange with a desired ion.

TABLE 1

| | Zeolite | Metal salt | Ion exchange rate |
|---|---|---|---|
| Ag ion-exchanged ZSM-5 powder | ZSM-5 | $CH_3COOAg$ | 80% |
| Cu ion-exchanged ZSM-5 powder | ZSM-5 | $Cu(CH_3COO)_2.H_2O$ | 85% |
| Ag ion-exchanged $\beta$-zeolite powder | $\beta$-Zeolite | $CH_3COOAg$ | 82% |

To each of the zeolite powders obtained above were added appropriate amounts of water and acetic acid. Thereto was added 5% by weight (as oxide) of an $Al_2O_3$ sol. The resulting mixture was subjected to wet pulverization to prepare three kinds of slurries to be coated. Each of the slurries was coated on a cordierite monolithic carrier manufactured by NGK Insulators, Ltd. (diameter: 4.66 in., volume: 1.0 l, partition wall thickness: 6 mil, cell density: 400 $cpi^2$). Each of the coated carriers was fired at 500° C. to obtain adsorbent D1 (containing Ag ion-exchanged ZSM-5), adsorbent D2 (containing Cu ion-exchanged ZSM-5), and adsorbent D3 (containing Ag ion-exchanged $\beta$-zeolite). In all the adsorbents, the amount of zeolite loaded was 0.15 g/cc.

Adsorbent D4 was obtained in the same manner as in adsorbent D1 except that, in the uncoated monolithic carrier, a blowing-through hole was made (the monolithic carrier after hole making had a volume of 0.95 l) by gouging a cylindrical portion of the carrier, having a diameter of 25 mm, whose central axis was identical with that of the carrier and which extended in the axial direction of the passages (cells) of the carrier.

Adsorbent D5 was obtained by coating, on the adsorbent D1, the same Pd-loaded $Al_2O_3.CeO_2$ slurry as used in the above [Production of catalysts], in a Pd amount of 100 g/$ft^3$ and then firing the resulting material at 500° C.

The Ag ion-exchanged ZSM-5 powder was immersed in an aqueous $Pd(NO_3)$ solution, followed by drying and firing at 500° C., to obtain a Pd-loaded, Ag ion-exchanged ZSM-5 powder. To the zeolite powder were added appropriate amounts of water and acetic acid. Thereto was added 5% by weight (as oxide) of an $Al_2O_3$ sol. The resulting mixture was subjected to wet pulverization to prepare a slurry to be coated. The slurry was coated on a cordierite monolithic carrier manufactured by NGK Insulators, Ltd. (diameter: 4.66 in., volume: 1.0 l, partition wall thickness: 6 mil, cell density: 400 $cpi^2$). The coated carrier was fired at 500° C. to obtain adsorbent D6. In the adsorbent, the amount of zeolite loaded was 0.15 g/cc; and the amount of Pd loaded was 100 g/$ft^3$, which was achieved by controlling the concentration of the aqueous $Pd(NO_3)$ solution at the time of immersion of the Ag ion-exchanged ZSM-5 powder in the solution.

[Production of electrically-heated catalyst (EHC)]

There were mixed a Fe powder, a Cr-30 Al powder (wt. %), a Fe-50Al powder (wt. %), a Fe-20B powder (wt. %), and an $Y_2O_3$ powder (all having an average particle diameter of 44 μm or less) so as to give a composition of Fe-18Cr-8Al-0.05B-0.5$Y_2O_3$ (wt. %). The resulting mixture was mixed with 4 g (per 100 g of the mixture) of methyl cellulose (as an organic binder) and 1 g (on the same basis) of oleic acid (as an oxidation inhibitor). The resulting readily formable bullet was subjected to extrusion molding to obtain a columnar honeycomb material. The honeycomb material was dried at 90° C. for 16 hours in air and then kept at 1,325° C. for 2 hours in a hydrogen atmosphere for sintering. The sintered material was heat-treated at 1,150° C. for 30 minutes in air to obtain a honeycomb structure. The honeycomb structure had a porosity of 3%.

Figure 17:
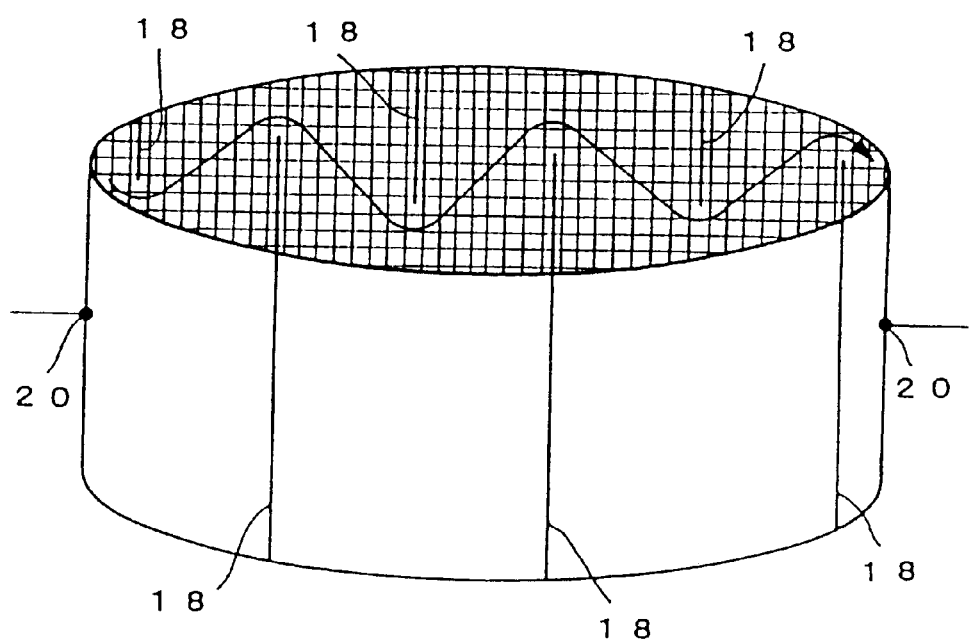
FIG. 17 is a drawing showing an electrically-heated catalyst.

The thus-obtained honeycomb structure having an outer diameter of 93 mm, a thickness of 25 mm, a partition wall thickness of 0.1 mm and a cell (square cell) density of 450 cpi² was subjected to grinding by hand saw to form, as shown in FIG. 17, six slits 18 in a direction parallel to the axes of the passages of the honeycomb structure so that the number of cells between two adjacent slits became seven and the honeycomb structure after slits formation had an electrical resistance of 50 mΩ. Next, on the honeycomb structure was coated the same Pd-loaded $Al_2O_3.CeO_2$ slurry as used in the above [Production of catalysts], followed by firing at 500° C., to form a catalyst layer so that the amount of Pd supported became 150 g/ft³. The resulting material was provided with electrodes 20 and placed in a casing made of SUS with a distance for insulation being taken between the casing and the material, to complete an electrically-heated catalyst (EHC) E1. This EHC had an effective volume of 0.13 l.

[Constitution of exhaust gas purification systems]

The following exhaust gas purification systems I to XVII were constituted using the catalysts, adsorbents, catalyst-adsorbents and electrically-heated catalyst obtained above. In the following description of each system, the numerical symbol of each catalyst, adsorbent, catalyst-adsorbent or electrically-heated catalyst, used in FIGS. 1 to 16 was shown in a parenthesis, in order to clearly distinguish their symbols A1 to A2, B1, C1 to C2, D1 to D6 and E1 from said symbol.

(System I)

As shown in FIG. 1, catalyst A2 (2) and adsorbent D5 (10) were disposed in this order with catalyst A2 (2) provided upstream in the flow direction of exhaust gas. Incidentally, the distance from the inlet of catalyst A2 (2) to the inlet of adsorbent D5 (10) was 200 mm.

(System II)

Figure 2:
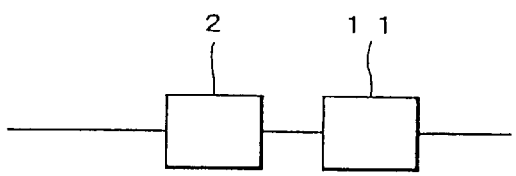
FIG. 2 is a schematic drawing showing the system for exhaust gas purification used in Example 2.

As shown in FIG. 2, catalyst A2 (2) and adsorbent D6 (11) were disposed in this order with catalyst A2 (2) provided upstream in the flow direction of exhaust gas. Incidentally, the distance from the inlet of catalyst A2 (2) to the inlet of adsorbent D6 (11) was 200 mm.

(System III)

Figure 3:
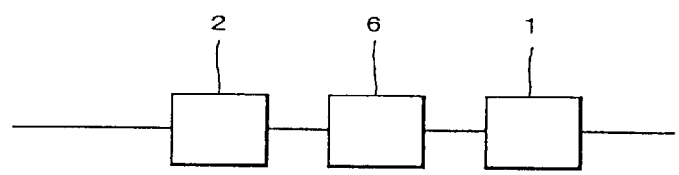
FIG. 3 is a schematic drawing showing the system for exhaust gas purification used in Example 3.

As shown in FIG. 3, catalyst A2 (2), adsorbent D1 (6) and catalyst A1 (1) were disposed in this order with catalyst A2 (2) provided most upstream in the flow direction of exhaust gas. Incidentally, the distance from the inlet of catalyst A2 (2) to the inlet of adsorbent D1 (6) was 200 mm; and the distance from the inlet of catalyst A2 (2) to the inlet of catalyst A1 (1) was 400 mm.

(System IV)

Figure 4:
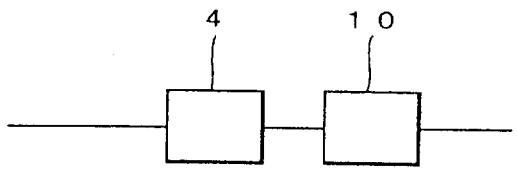
FIG. 4 is a schematic drawing showing the system for exhaust gas purification used in Example 4.

As shown in FIG. 4, catalyst-adsorbent C1 (4) and adsorbent D5 (10) were disposed in this order with catalyst-adsorbent C1 (4) provided upstream in the flow direction of exhaust gas. Incidentally, the distance from the inlet of catalyst-adsorbent C1 (4) to the inlet of adsorbent D5 (10) was 200 mm.

(System V)

Figure 5:
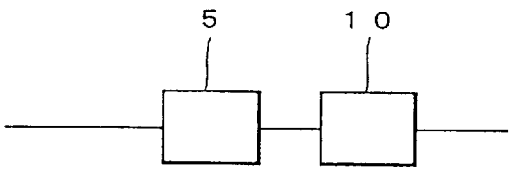
FIG. 5 is a schematic drawing showing the system for exhaust gas purification used in Example 5.

As shown in FIG. 5, catalyst-adsorbent C2 (5) and adsorbent D5 (10) were disposed in this order with catalyst-adsorbent C2 (5) provided upstream in the flow direction of exhaust gas. Incidentally, the distance from the inlet of catalyst-adsorbent C2 (5) to the inlet of adsorbent D5 (10) was 200 mm.

(System VI)

Figure 6:
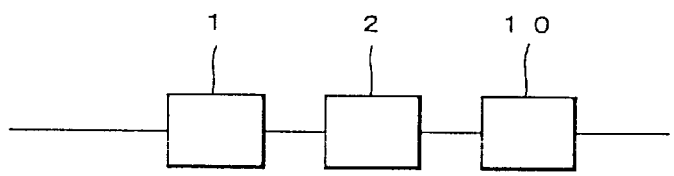
FIG. 6 is a schematic drawing showing the system for exhaust gas purification used in Example 6.

As shown in FIG. 6, catalyst A1 (1), catalyst A2 (2) and adsorbent D5 (10) were disposed in this order with catalyst A1 (1) provided most upstream in the flow direction of exhaust gas. Incidentally, the distance from the inlet of catalyst A1 (1) to the inlet of catalyst A2 (2) was 200 mm; and the distance from the inlet of catalyst A1 (1) to the inlet of adsorbent D5 (10) was 400 mm.

(System VII)

Figure 7:
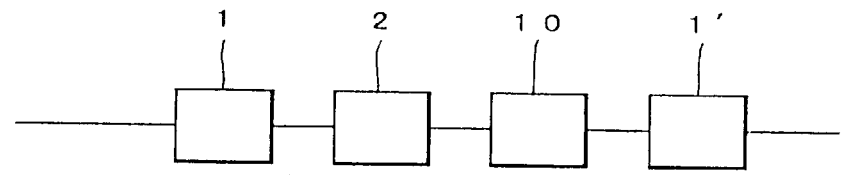
FIG. 7 is a schematic drawing showing the system for exhaust gas purification used in Example 7.

As shown in FIG. 7, catalyst A1 (1), catalyst A2 (2), adsorbent D5 (10) and catalyst A1 (1') were disposed in this order with catalyst A1 (1) provided most upstream in the flow direction of exhaust gas. Incidentally, the distance from the inlet of catalyst A1 (1) to the inlet of catalyst A2 (2) was 200 mm; the distance from the inlet of catalyst A1 (1) to the inlet of adsorbent D5 (10) was 400 mm; and the distance from the inlet of catalyst A1 (1) to the inlet of catalyst A1 (1') was 600 mm.

(System VIII)

Figure 8:
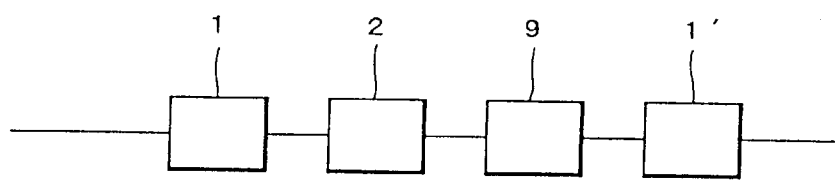
FIG. 8 is a schematic drawing showing the system for exhaust gas purification used in Example 8.

As shown in FIG. 8, catalyst A1 (1), catalyst A2 (2), adsorbent D4 (9) and catalyst A1 (1') were disposed in this order with catalyst A1 (1) provided most upstream in the flow direction of exhaust gas. Incidentally, the distance from the inlet of catalyst A1 (1) to the inlet of catalyst A2 (2) was 200 mm; the distance from the inlet of catalyst A1 (1) to the inlet of adsorbent D4 (9) was 400 mm; and the distance from the inlet of catalyst A1 (1) to the inlet of catalyst A1 (1') was 600 mm.

(System IX)

Figure 9:
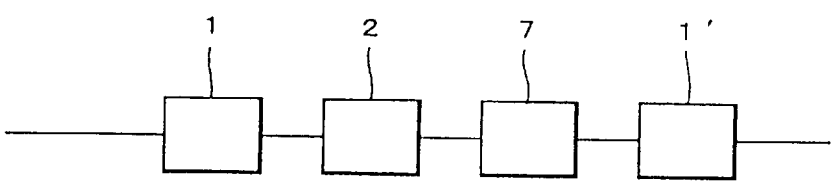
FIG. 9 is a schematic drawing showing the system for exhaust gas purification used in Example 9.

As shown in FIG. 9, catalyst A1 (1), catalyst A2 (2), adsorbent D2 (7) and catalyst A1 (1') were disposed in this order with catalyst A1 (1) provided most upstream in the flow direction of exhaust gas. Incidentally, the distance from the inlet of catalyst A1 (1) to the inlet of catalyst A2 (2) was 200 mm; the distance from the inlet of catalyst A1 (1) to the inlet of adsorbent D2 (7) was 400 mm; and the distance from the inlet of catalyst A1 (1) to the inlet of catalyst A1 (1') was 600 mm.

(System X)

Figure 10:
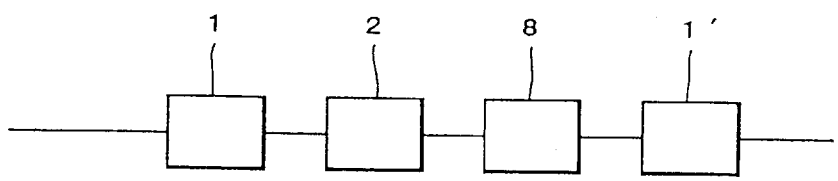
FIG. 10 is a schematic drawing showing the system for exhaust gas purification used in Example 10.

As shown in FIG. 10, catalyst A1 (1), catalyst A2 (2), adsorbent D3 (8) and catalyst A1 (1') were disposed in this order with catalyst A1 (1) provided most upstream in the flow direction of exhaust gas. Incidentally, the distance from the inlet of catalyst A1 (1) to the inlet of catalyst A2 (2) was 200 mm; the distance from the inlet of catalyst A1 (1) to the inlet of adsorbent D3 (8) was 400 mm; and the distance from the inlet of catalyst A1 (1) to the inlet of catalyst A1 (1') was 600 mm.

(System XI)

Figure 11:
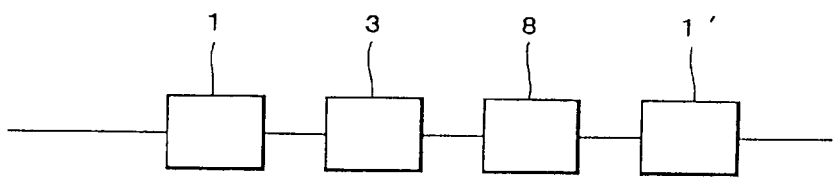
FIG. 11 is a schematic drawing showing the system for exhaust gas purification used in Example 11.

As shown in FIG. 11, catalyst A1 (1), adsorbent B1 (3), adsorbent D3 (8) and catalyst A1 (1') were disposed in this order with catalyst A1 (1) provided most upstream in the flow direction of exhaust gas. Incidentally, the distance from the inlet of catalyst A1 (1) to the inlet of adsorbent B1 (3) was 200 mm; the distance from the inlet of catalyst A1 (1) to the inlet of adsorbent D3 (8) was 400 mm; and the distance from the inlet of catalyst A1 (1) to the inlet of catalyst A1 (1') was 600 mm.

(System XII)

Figure 12:
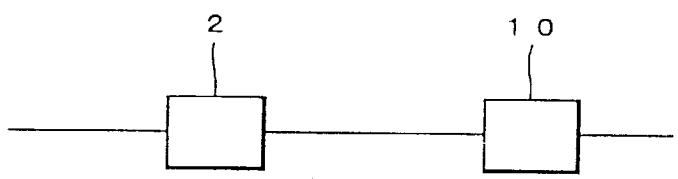
FIG. 12 is a schematic drawing showing the system for exhaust gas purification used in Example 12.

As shown in FIG. 12, catalyst A2 (2) and adsorbent D5 (10) were disposed in this order with catalyst A2 (2) provided upstream in the flow direction of exhaust gas. Incidentally, the distance from the inlet of catalyst A2 (2) to the inlet of adsorbent D5 (10) was 400 mm.

(System XIII)

There was used the same constitution as in the system I shown in FIG. 1 except that a water-cooling device was provided between catalyst A2 (2) and adsorbent D5 (10).

(System XIV)

Figure 13:
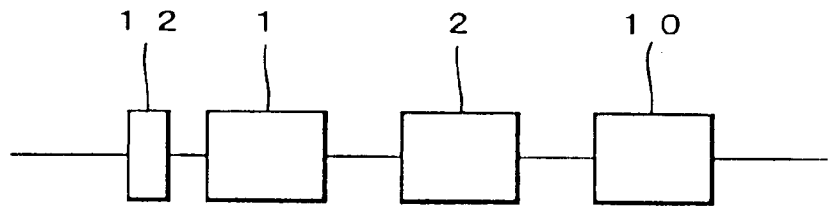
FIG. 13 is a schematic drawing showing the system for exhaust gas purification used in Example 15.

As shown in FIG. 13, there was used the same constitution as in the system VI shown in FIG. 6 except that electrically-heated catalyst E1 (12) was provided upstream of and close to catalyst A1 (1).

(System XV)

Figure 14:
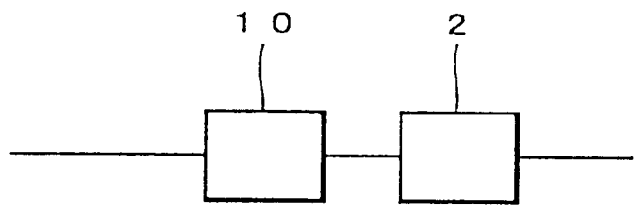
FIG. 14 is a schematic drawing showing the system for exhaust gas purification used in Comparative Example 1.

As shown in FIG. 14, adsorbent D5 (10) and catalyst A2 (2) were disposed in this order with adsorbent D5 (10) provided upstream in the flow direction of exhaust gas. Incidentally, the distance from the inlet of adsorbent D5 (10) to the inlet of catalyst A2 (2) was 200 mm.

(System XVI)

Figure 15:
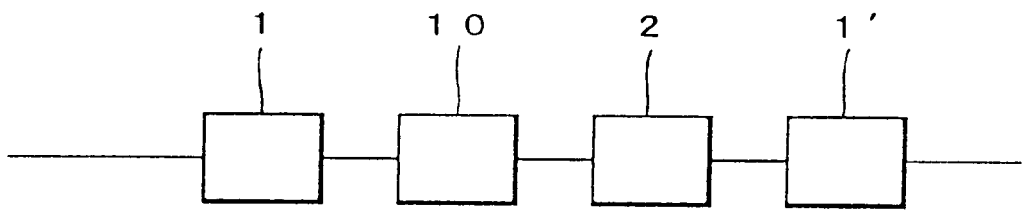
FIG. 15 is a schematic drawing showing the system for exhaust gas purification used in Comparative Example 2.

As shown in FIG. 15, catalyst A1 (1), adsorbent D5 (10), catalyst A2 (2) and catalyst A1 (1') were disposed in this order with catalyst A1 (1) provided most upstream in the flow direction of exhaust gas. Incidentally, the distance from the inlet of catalyst A1 (1) to the inlet of adsorbent D5 (10) was 200 mm; the distance from the inlet of catalyst A1 (1) to the inlet of catalyst A2 (2) was 400 mm; and the distance from the inlet of catalyst A1 (1) to the inlet of catalyst A1 (1') was 600 mm.

(System XVII)

Figure 16:
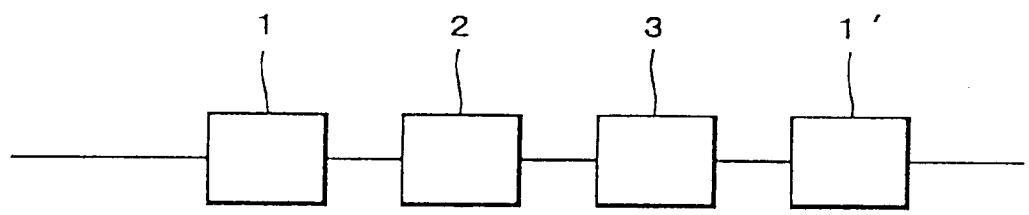
FIG. 16 is a schematic drawing showing the system for exhaust gas purification used in Comparative Example 3.

As shown in FIG. 16, catalyst A1 (1), catalyst A2 (2), adsorbent B1 (3), and catalyst A1 (1') were disposed in this order with catalyst A1 (1) provided most upstream in the flow direction of exhaust gas. Incidentally, the distance from the inlet of catalyst A1 (1) to the inlet of catalyst A2 (2) was 200 mm; the distance from the inlet of catalyst A1 (1) to the inlet of adsorbent B1 (3) was 400 mm; and the distance from the inlet of catalyst A1 (1) to the inlet of catalyst A1 (1') was 600 mm.

[Evaluation of exhaust gas purification systems]

Each of the systems I to XVII was set in the exhaust gas line of an actual engine so that the exhaust gas temperature at the inlet of the catalyst, adsorbent or catalyst-adsorbent of each system, provided at the most up-stream position of the system became 850° C. Then, the engine was operated for 60 seconds at an A/F ratio close to the stoichiometric ratio (14.4). Thereafter, fuel feeding was cut for 5 seconds to shift the A/F ratio to a lean fuel side. In this engine operational mode including the above fuel-cutting, each system was subjected to aging for total 100 hours. Incidentally, in the case of the system XIII, adsorbent D5 was cooled during the aging, by the water-cooling device provided between catalyst A2 and adsorbent D5.

Each system after the aging was disposed in the exhaust gas line of a L4 type engine of 2,000 cc displacement mounted on a vehicle, so that the inlet of the catalyst, adsorbent or catalyst-adsorbent of the system, provided at the most upstream position of the system was at a point of 700 mm from the engine exhaust port. Then, each system was subjected to a FTP and measured for HC emission (HC emission and $NO_x$ emission for part of the systems) according to Bag 1 which is an indication of cold start property. The results are shown in Table 3.

In the FTP of Example 15 using system XIV, electrically-heated catalyst E1 was electrified at 2 kW for 30 seconds from the engine start. In Example 13 using system XIII, adsorbent D5 was cooled during the FTP, by the water-cooling device provided between catalyst A2 and adsorbent D5.

In all of Examples and Comparative Examples, secondary air was introduced into the systems. Except in Example 14, secondary air was introduced at a rate of 100 l/min for 0 to 100 seconds from the engine start and at a rate of 50 l/min for 100 to 250 seconds from the engine start, from an exhaust pipe position of 200 mm from the engine exhaust port. In Example 14, secondary air was introduced at a rate of 100 l/min for 0 to 100 seconds from the engine start from an exhaust pipe position of 200 mm from the engine exhaust port and at a rate of 50 l/min for 100 to 250 seconds from the engine start from between catalyst A2 and adsorbent D5.

After the FTP, a cylindrical sample (1 in. in diameter and 2 in. in length) was cut out from each adsorbent using an ion-containing zeolite (i.e. either of D1to D6), of each system and measured for HC adsorptivity as follows in order to exactly know the extent at which the adsorbent was protected from thermal deterioration. That is, through each sample was passed a synthetic exhaust gas ($\lambda=0.96$) of a composition shown in Table 2, simulating an exhaust gas during the cold start of engine, at a space velocity (SV) of 40,000 $hr^{-1}$ at an exhaust gas temperature of 200° C. for 150 seconds; the HC concentration in the exhaust gas leaving the sample was measured; and the HC adsorptivity of the sample was calculated. The results are shown in Table 3.

TABLE 2

| Composition of synthetic exhaust gas (by volume) | |
|---|---|
| $CO_2$ | 16.0% |
| $O_2$ | 0.77% |
| CO | 2.0% |
| $H_2$ | 0.33% |
| HC | 4,500 ppm (as carbon) |
| NO | 1,500 ppm |
| $H_2O$ | 10% |
| $N_2$ | Remainder |

TABLE 3

| | System | Total volume of loaded carrier (l)*1 | Bag 1 emissions (g/mile) HC | Bag 1 emissions (g/mile) $NO_x$ | HC adsorptivity (%) |
|---|---|---|---|---|---|
| Example 1 | I | 1.0 | 0.259 | 0.793 | 62 |
| Example 2 | II | 1.0 | 0.268 | — | 64 |
| Example 3 | III | 1.0 | 0.262 | — | 67 |
| Example 4 | IV | 1.0 | 0.253 | — | 65 |
| Example 5 | V | 0.95 | 0.252 | — | 60 |
| Example 6 | VI | 1.5 | 0.213 | — | 75 |
| Example 7 | VII | 1.5 | 0.187 | — | 76 |
| Example 8 | VIII | 1.5 | 0.182 | — | 85 |
| Example 9 | IX | 1.5 | 0.195 | — | 72 |
| Example 10 | X | 1.5 | 0.168 | — | 81 |
| Example 11 | XI | 1.5 | 0.191 | — | 83 |
| Example 12 | XII | 1.0 | 0.245 | — | 68 |
| Example 13 | XIII | 1.0 | 0.236 | — | 77 |
| Example 14 | I | 1.0 | 0.254 | 0.571 | 61 |
| Example 15 | XIV | 1.5 | 0.190 | — | 77 |
| Comparative Example 1 | XV | (No carrier) loaded | 0.349 | — | 43 |
| Comparative Example 2 | XVI | 0.5 | 0.303 | — | 49 |
| Comparative Example 3 | XVII | — | 0.342 | — | — |

*1: The total volume of a catalyst, adsorbent and/or catalyst-adsorbent provided upstream of an adsorbent using an ion-containing zeolite.

As is clear from Table 3, Examples 1 to 15 each using a system comprising (1) an adsorbent using an ion-containing zeolite, i.e. either of D1 to D6 and (2) a loaded carrier (a catalyst, an adsorbent and/or an adsorbent-catalyst) having a total volume of 0.6 l or more, provided upstream of the adsorbent (1) showed low HC emissions as compared with Comparative Example 1 using a system comprising no loaded carrier upstream of an adsorbent using an ion-containing zeolite, or with Comparative Example 2 using a system comprising a loaded carrier having a total volume of less than 0.6 l, upstream of an adsorbent using an ion-containing zeolite, or with Comparative Example 3 using a system comprising no adsorbent using an ion-containing zeolite.

HC emissions were particularly low in Examples 6 to 11 and 15 each using a system comprising a loaded carrier having a larger total volume (i.e. a larger total heat capacity), upstream of an adsorbent using an ion-containing zeolite. $NO_x$ emission also decreased in Example 14 wherein the position of secondary air introduction was changed, in the middle, from upstream of catalyst A2 to between catalyst A2 and adsorbent D5, because catalyst A2 was released from a lean atmosphere soon after the light-off.

The samples cut out from the adsorbents each using an ion-containing zeolite, of the systems used in Examples 1 to 15, as compared with the samples cut out from the adsorbents each using an ion-containing zeolite, of the systems used in Comparative Examples 1 and 2, showed high HC adsorptivities, and received low thermal loads during the aging and the FTP.

As described above, in the exhaust gas purification system of the present invention comprising (1) an adsorbent using a zeolite containing an ion of an element having an electronegativity of 1.40 or more (such a zeolite per se has a high HC desorption start temperature but low heat resistance and accordingly its practical use has been difficult) and (2) a loaded carrier of given volume provided upstream of the adsorbent (1), the thermal load of the adsorbent is reduced and the performance of the adsorbent is maintained over a long period of time. Moreover, since the loaded carrier has per se an HC adsorptivity and a purifiability for the harmful substances present in exhaust gas, the present system has a high overall purification ability.

What is claimed is:

1. A system for exhaust gas purification disposed in the exhaust pipe of an internal combustion engine having a unitary pipe construction through which all of the exhaust gas entering the exhaust pipe continuously flows, which comprises:
   (A) an exhaust gas purifier comprising:
      (a) an adsorbent formed by loading, on a monolithic carrier, (1) a zeolite containing at least one kind of ion of an element having an electronegativity of 1.40 or more and (2) a catalyst material formed by loading at least one kind of noble metal selected from Pt, Pd and Rh on a heat resistant inorganic oxide, said zeolite and catalyst material being loaded on the monolithic carrier either in a mixed state or in a state of laminated layers, and
      (b) at least one loaded carrier formed by loading, on a monolithic carrier, a catalyst component having a purifiability for the harmful substances present in the exhaust gas emitted from the engine and/or an adsorbent component having an adsorptivity for the hydrocarbons also present in the exhaust gas, the loaded carrier being provided upstream of the adsorbent in the flow direction of the exhaust gas and having a total volume of 0.6 l or more
   (B) an exhaust pipe of an internal combustion engine having a unitary pipe construction through which all of the exhaust gas from the engine entering the exhaust pipe continuously flows, said exhaust gas purifier (A) located in said exhaust pipe (B).

2. A system for exhaust gas purification according to claim 1, wherein at least part of the catalyst material of the adsorbent is formed by loading Pd on a heat-resistant inorganic oxide in an amount of 1–30% by weight based on the heat-resistant inorganic oxide.

3. A system for exhaust gas purification according to claim 1, wherein the zeolite of the adsorbent has a $SiO_2/Al_2O_3$ molar ratio of 40 or more.

4. A system for exhaust gas purification according to claim 1, wherein the zeolite of the adsorbent is at least one kind selected from ZSM-5, USY, β-zeolite and a metallosilicate.

5. A system for exhaust gas purification according to claim 1, wherein the at least one kind of ion is selected from the ions of 1B group elements (Cu, Ag and Au) of periodic table.

6. A system for exhaust gas purification according to claim 1, which further comprises a catalyst downstream of the adsorbent.

7. A system for exhaust gas purification according to claim 1, which further comprises an electrically-heated catalyst in the exhaust pipe which is positioned either upstream of the system to accelerate the warm-up of the system or downstream of said adsorbent to ensure purification of the HC desorbed from the adsorbent.

8. A system for exhaust gas purification disposed in the exhaust pipe of an internal combustion engine having a unitary pipe construction through which all of the exhaust gas entering the exhaust pipe continuously flows, which comprises:
   (A) an exhaust gas purifier comprising:
      (a) an adsorbent formed by loading, on a monolithic carrier, a zeolite containing (1) at least one kind of ion of an element having an electronegativity of 1.40 or more and (2) at least one kind of noble metal selected from Pt, Pd and Rh, and
      (b) at least one loaded carrier formed by loading, on a monolithic carrier, a catalyst component having a purifiability for the harmful substances present in the exhaust gas emitted from the engine and/or an adsorbent component having an adsorptivity for the hydrocarbons also present in the exhaust gas, the loaded carrier being provided upstream of the adsorbent in the flow direction of the exhaust gas and having a total volume of 0.6 l or more; and
   (B) an exhaust pipe of an internal combustion engine having a unitary pipe construction through which all of the exhaust gas from the engine entering the exhaust pipe continuously flows, said exhaust gas purifier (A) located in said exhaust pipe (B).

9. A system for exhaust gas purification according to claim 8, wherein the zeolite of the adsorbent has a $SiO_2/Al_2O_3$ molar ratio of 40 or more.

10. A system for exhaust gas purification according to claim 8, wherein the zeolite of the adsorbent is at least one kind selected from ZSM-5, USY, β-zeolite and a metallosilicate.

11. A system for exhaust gas purification according to claim 8, wherein the at least one kind of ion is selected from the ions of 1B group elements (Cu, Ag and Au) of periodic table.

12. A system for exhaust gas purification according to claim 8, which further comprises a catalyst downstream of the adsorbent.

13. A system for exhaust gas purification according to claim 8, which further comprises an electrically-heated catalyst in the exhaust pipe which is positioned either upstream of the system to accelerate the warm-up of the system or downstream of said adsorbent, to ensure purification of the HC desorbed from the adsorbent.

14. A system for exhaust gas purification disposed in the exhaust pipe of an internal combustion engine having a unitary pipe construction through which all of the exhaust gas entering the exhaust pipe continuously flows, which comprises:

(A) an exhaust gas purifier comprising:
   (a) an adsorbent formed by loading, on a monolithic carrier, a zeolite containing at least one kind of ion of an element having an electronegativity of 1.40 or more,
   (b) a catalyst formed by loading, on a monolithic carrier, a catalyst material formed by loading at least one kind of noble metal selected from Pt, Pd and Rh on a heat resistant inorganic oxide, the catalyst being provided downstream of the adsorbent in the flow direction of the exhaust gas emitted from the engine, and
   (c) at least one loaded carrier formed by loading, on a monolithic carrier, a catalyst component having a purifiability for the harmful substances present in the exhaust gas emitted from the engine and/or an adsorbent component having an adsorptivity for the hydrocarbons also present in the exhaust gas, the loaded carrier being provided upstream of the adsorbent in the flow direction of the exhaust gas and having a total volume of 0.6 l or more; and (B) an exhaust pipe of an internal combustion engine having a unitary pipe construction through which all of the exhaust gas from the engine entering the exhaust pipe continuously flows, said exhaust gas purifier (A) located in said exhaust pipe (B).

15. A system for exhaust gas purification according to claim 14, wherein the carrier of the adsorbent and the carrier of the catalyst forms an integral monolithic carrier the zeolite of the adsorbent and the catalyst material of the catalyst are loaded on separate parts of the integral monolithic carrier with the zeolite being loaded on the upstream part and the catalyst material being loaded on the downstream part and thereby the adsorbent and the catalyst are constituted in one piece.

16. A system for exhaust gas purification according to claim 14, wherein at least part of the catalyst material of the catalyst is formed by loading Pd on a heat-resistant inorganic oxide in an amount of 1–30% by weight based on the heat-resistant inorganic oxide.

17. A system for exhaust gas purification according to claim 14, wherein the zeolite of the adsorbent has a $SiO_2/Al_2O_3$ molar ratio of 40 or more.

18. A system for exhaust gas purification according to claim 14, wherein the zeolite of the adsorbent is at least one kind selected from ZSM-5, USY, β-zeolite and a metallosilicate.

19. A system for exhaust gas purification according to claim 14, wherein the at least one kind of ion is selected from the ions of 1B group elements (Cu, Ag and Au) of periodic table.

20. A system for exhaust gas purification according to claim 14, which further comprises another catalyst downstream of the catalyst.

21. A system for exhaust gas purification according to claim 14, which further comprises an electrically-heated catalyst in the exhaust pipe which is positioned either upstream of the system to accelerate the warm-up of the system or downstream of said adsorbent, to ensure purification of the HC desorbed from the adsorbent.

* * * * *